United States Patent [19]

Habicht

[11] Patent Number: 5,620,167

[45] Date of Patent: Apr. 15, 1997

[54] MODULAR BUTTERFLY VALVE FOR TABLETS, CAPSULES AND THE LIKE

[76] Inventor: Helmut Habicht, 39 W. Wildewood Rd., Saddle River, N.J. 07458

[21] Appl. No.: 603,902

[22] Filed: Feb. 22, 1996

[51] Int. Cl.6 ........................................................ F16K 1/22
[52] U.S. Cl. ............................................. 251/306; 251/307
[58] Field of Search .................................... 251/306, 305, 251/307

[56] References Cited

U.S. PATENT DOCUMENTS

| | | | |
|---|---|---|---|
| 3,801,066 | 4/1974 | Miles et al. | 251/306 X |
| 5,236,003 | 8/1993 | Habicht | 251/306 |

*Primary Examiner*—John C. Fox
*Attorney, Agent, or Firm*—Patrick J. Pinto

[57] ABSTRACT

A modular butterfly valve for interupting the flow of particulate articles such as tablets, capsules, pills, and the like that includes a disk member which is selectively operable between an open position and a closed position. The disk member is pivotly carried by a pair of tranverse apertures of an elastomer valve seat. The elastomer valve seat also includes an outside diameter, and a seat portion. The seat portion includes a pair of sealing lips that are cantilevered at a selected angle from one end of the elastomer valve seat. The sealing lips form a first throat portion and a second throat portion. In the closed position, a first of the sealing lips abuts one side of the disk member while a second of the sealing lips abuts a peripheral edge of the disk member. The valve seat is retained between a housing and a removable clamping ring. The housing is configured for a quick connect coupling arrangement with a delivery end of a supply bin. The valve of the present invention minimizes damage to the articles during selective operation to a closed position.

2 Claims, 3 Drawing Sheets

MODULAR BUTTERFLY VALVE FOR TABLETS, CAPSULES AND THE LIKE

BACKGROUND OF THE INVENTION

1. Field of the Invention

With regard to the classification of art, this invention is believed to be found in the general class entitled "Valves and Valve Actuation" and more particularly to those subclasses pertaining to rotary butterfly valves that are used to control the flow of particulate articles without damage to the articles.

2. Description of Related Art

Butterfly valves are known in the prior art. Two examples of the known prior art are U.S. Pat. No. 5,236,003 that issued to Habicht on Aug. 17, 1993, and U.S. Pat. No. 5,388,807 that issued to Habicht on Feb. 14, 1995. U.S. Pat. Nos. 5,236,003 and 5,388,807 are solely owned by the present inventor.

U.S. Pat. Nos. 5,236,003 and 5,388,807 have been successfully used in many material handling applications. The quick coupling and modular design has resulted in the use of these valves at the discharge or delivery end of hoppers, bins and the like, that hold flowable dry granular materials. It has been found that the modular features of U.S. Pat. Nos. 5,236,003 and 5,388,807 have many advantages in the pharmaceutical and food industries. The easy disassembly and thorough cleaning features of each of these valves have led to attempts the use of these valves in process applications for controlling the flow of fragile particulate articles such as tablets, capsules and the like. One disadvantage of these valves when used with fragile particulate articles is breakage or damage to the articles. It has been found that particulate articles are broken in the cited prior art valves dudng the closing of the valve.

It therefore has been determined that a low profile valve is required which is capable of easy disassembly, cleaning, and reassembly. It is also very important that the needed valve be capable of feeding particulate articles without breakage. The needed valve must also meet the cleanliness validation requirements of agencies, that monitor the pharmaceutical, and food industries.

The present invention solves the identified needs that are described above.

SUMMARY OF THE INVENTION

The present invention may be summarized with respect to its objects. It is an object of this invention to provide and it does provide a butterfly valve which is easily disassembled from a production line.

It is another object of this invention to provide and it does provide a butterfly valve that substantially eliminates the breakage of particulate articles. The breakage is usually caused by the catching and pinching of those articles between the disc and the valve seat.

It is yet another object of this invention to provide and it does provide a butterfly valve that meets the cleaning procedures, that need validation.

One embodiment of the present invention may be briefly summarized as: a modular butterfly valve for interrupting the flow of a product such as tablets, capsules and the like without damaging said product comprising: a) a disc member having a predetermined radius and being adapted to be rotated between an open position and a closed position, said disc member having opposing hubs, each hub member having a shaft member extending therefrom, a first of said shaft members having a sufficient length for extending exterior of the butterfly valve, a second of said shaft members having a determined length; b) a housing having a first cylindrical through bore and a counterbore formed concentrically with said first through bore, said counterbore having a determined depth for providing a shelf portion, said housing having a first retaining flange and a second retaining flange, said first retaining flange being selectively contoured for engagement by a quick coupling ring, said second retaining flange being selectively contoured for engagement by a second quick coupling ring, a transverse aperture being sized for allowing said first of said shaft members to pass therethrough with a predetermined clearance; c) an elastomer valve seat having an outer diameter, a seat portion, and a pair of second transverse apertures, the seat portion having a pair of sealing lips being cantilevered at a selected angle from a selected portion of the valve seat near one of its ends, each of the sealing lips having a first attaching end and a distal end, each of the attaching ends forming a first throat portion, the distal end being contoured to provide a second throat portion that has a radius that is smaller than the predetermined radius of the disc member; each of the pair of sealing lips having a predetermined length for positioning said distal end at a selected position with respect to an axis of said disc member, the sealing lip having a predetermined arcuate length; d) a clamping ring having a second through bore, a pilot diameter, and a third retaining flange, the second through bore being substantially equal in diameter to said first through bore, the pilot diameter of said clamping ring being adapted to removably seat in said counterbore while retaining the valve seat in a preferred arrangement between a face of the clamping ring and the shelf portion of the housing, the third retaining flange being sized and contoured for a coupled abutment with the second retaining flange of the housing by the quick coupling ring; and wherein said disc member is resiliently suspended and biased by the valve seat for allowing self centering of the disc member in a direction transverse to a direction of material flow, each of the sealing lips of the valve seat abutting the disc member when in a closed position absent a cutting action for preventing damage to the product.

In addition to the above summary, the following disclosure is intended to be detailed to insure adequacy and aid in the understanding of the invention. However, this disclosure, showing embodiments of the invention, is not intended to describe each new inventive concept which may arise. These specific embodiments have been chosen to show at least one best mode for the valve of the present invention. These specific embodiments may also be diagrammatic for the purpose of illustration and description as shown in the accompanying drawings.

Figure 1:
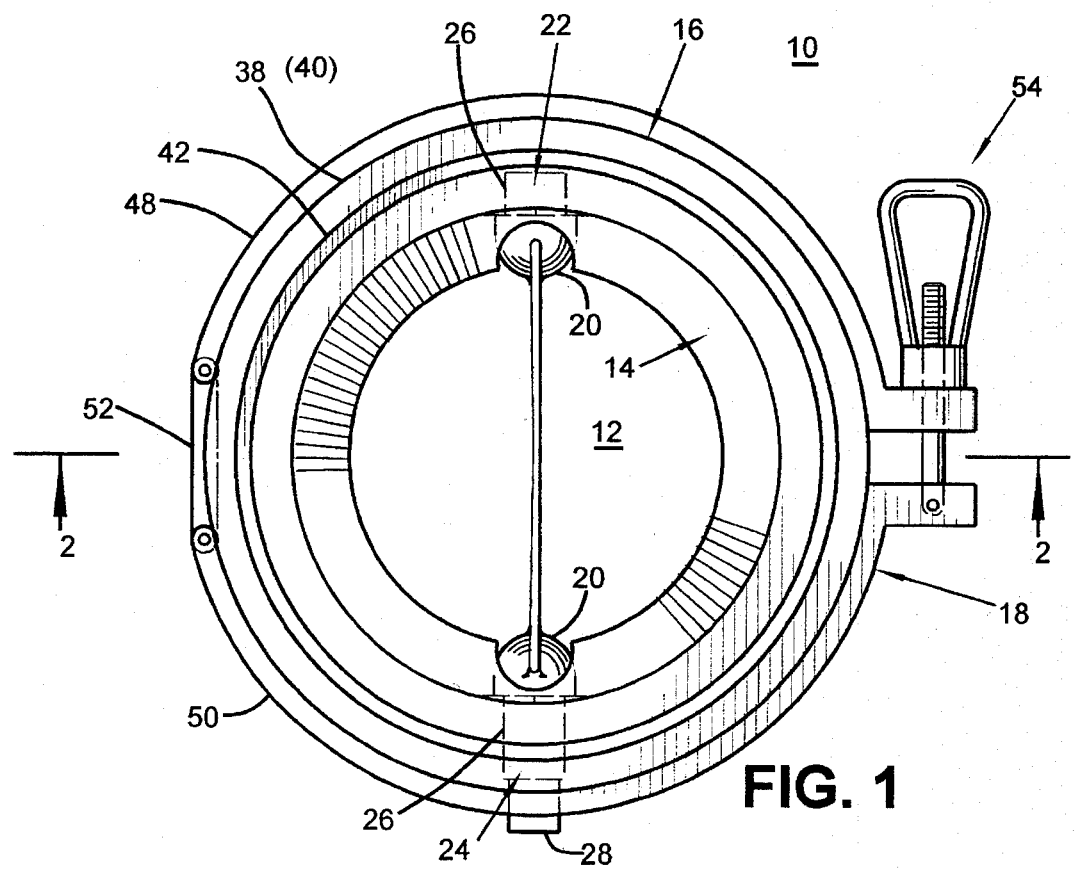
FIG. 1 represents a plan view of a modular butterfly valve of the present invention, this view showing a disc member in an open condition.

In the following description and in the claims, various details are identified by specific names for convenience. These names are intended to be generic in their application while differentiating between the various members. Corresponding reference numbers refer to like members throughout the several figures of the drawing.

The drawings accompanying and forming a part of this specification disclose details of construction for the sole purpose of explanation. It is to be understood that structural details may be modified without departing from the concept and principles of the invention as claimed. This invention may be incorporated into other structural forms than shown.

DETAILED DESCRIPTION OF THE INVENTION

Referring first to FIGS. 1, 2, 3 and 4, a modular butterfly valve assembly of the present invention is generally identified as 10. The construction of this valve 10 is very similar to the valve disclosed in U.S. Pat. Nos. 5,236,003, 5,388, 807, 5,236,003 and 5,388,807 are incorporated by reference into this application to the extent the law allows.

This butterfly valve assembly 10 includes a disc member 12, a valve seat 14, a housing 16, and at least one hinged quick coupling ring 18.

The disc member 12 includes opposing hubs 20 which are firmly attached thereto by welding and the like. It is preferred that the welded connection of the hubs 20 to the disc be made and contoured to provide a smooth flowing surface, for avoiding the collection of material thereon. Shaft members 22 and 24 extend in opposite directions along a common axis from their respective hubs 20. The hubs 20 are preferably cylindrical with hemi-spherical interior ends. It is preferred that the shafts 22 and 24 have a smaller diameter than the hubs 20. Shafts 22 and 24 include a reduced diameter portion 26. This reduced diameter portion 26 projects a selected distance. This reduced diameter portion 26 may be formed as a unitary piece with the hubs 20 or as a separate piece. This separate piece may be a pin, a cam follower, or the like.

Figure 3:
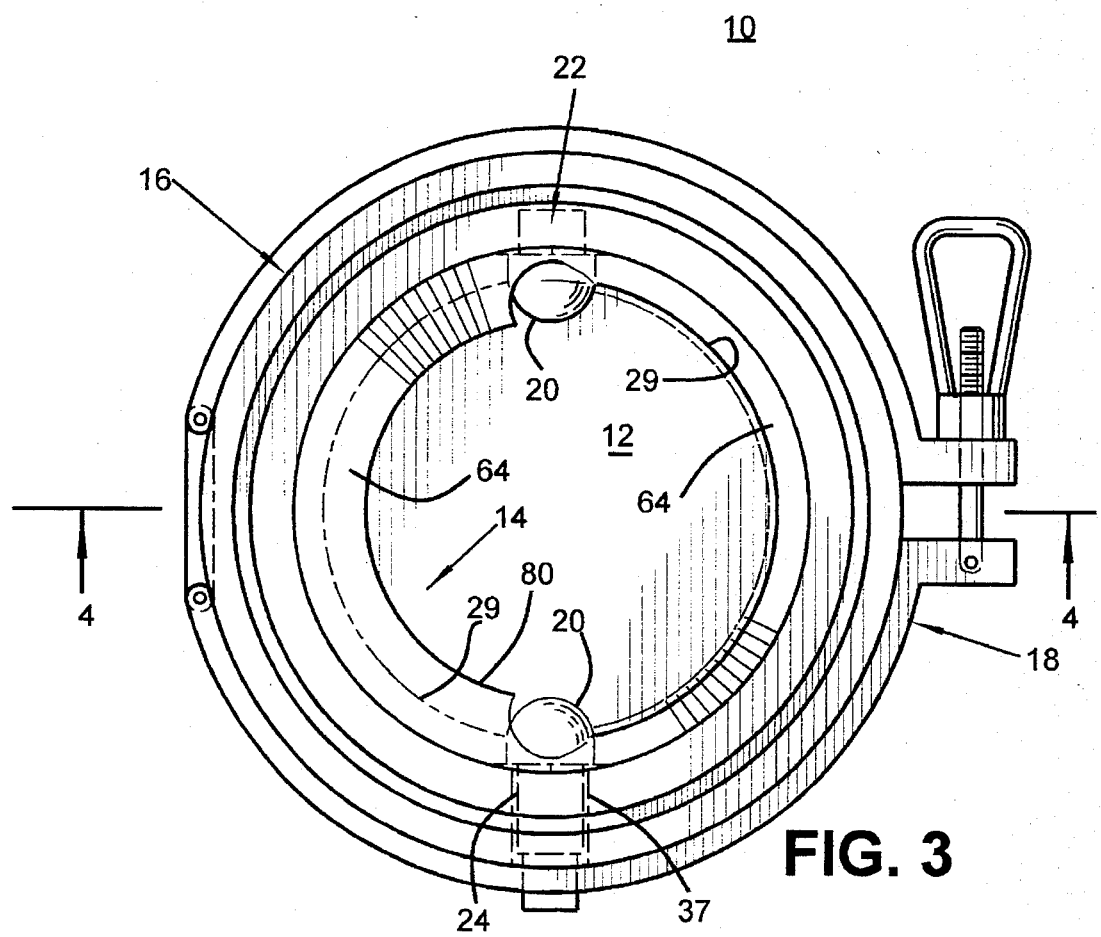
FIG. 3 represents a plan view of the present invention, this view showing the disc member in a closed position.

The shaft 24 is of sufficient length to extend exterior of the valve assembly 10, in order to provide a means for selectively rotating the disc member 12. This selective rotation controls the positioning of the disc member 12 between a closed position and an open position. The open position is depicted in FIG. 1 and the closed position is depicted in FIG. 3. The end of the shaft 24 distal the hub 20 is provided with a driving end 28 such as a square, spline, and the like. Typical manual and powered drive means have been shown and discussed in my U.S. Pat. No. 5,236,003.

Figure 2:
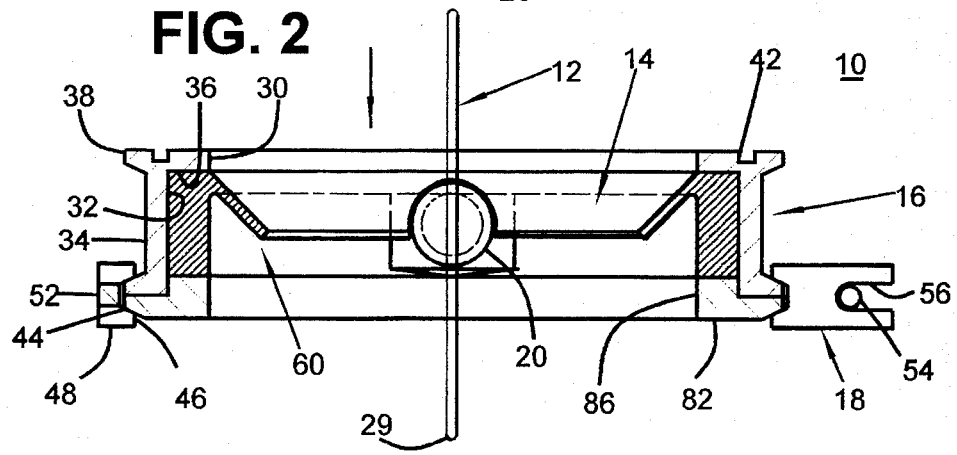
FIG. 2 represents a side elevation view of the present invention, this view, in section, has been taken along line 2—2 of FIG. 1.

It is preferred that the disc member 12 be highly polished for minimizing friction. The peripheral edge 29 should have a radius, as shown in FIG. 2. For example, a disc member made of 11 Ga. Stainless Steel, preferably has a radius of 2.54 mm, (0.100 in.).

Figure 4:
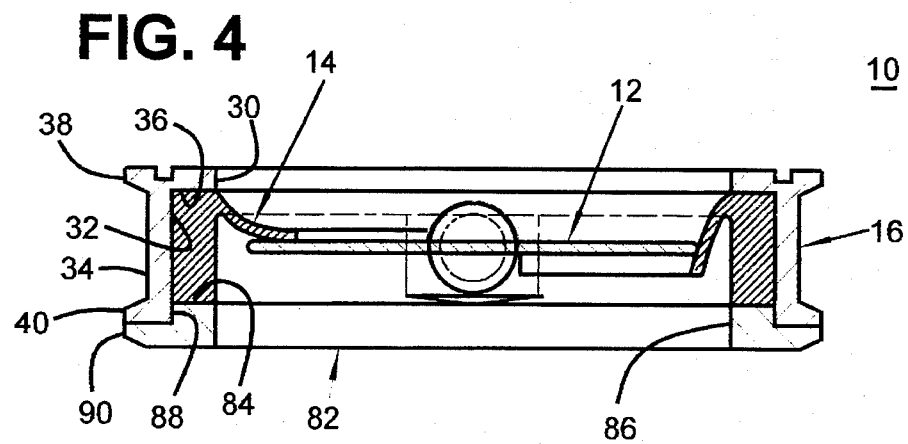
FIG. 4 represents a side elevation view of the present invention, this view, in section, has been taken along line 4—4 of FIG. 3, a clamp ring has been removed for clarity of the illustration.

Referring now to FIGS. 3 and 4, the housing 16 includes a cylindrical through bore 30, a counterbore 32, and an outside diameter 34. The counterbore 32 is formed substantially concentric with the through bore 30. The counter bore 32 has a predetermined depth for providing a shelf 36. The housing 16 further includes a transverse aperture 37, a first retaining flange 38 and a second retaining flange 40. Each of the retaining flanges 38 and 40 extend radially from opposite ends of the outside diameter 34 of the housing 16. Each of the retaining flanges 38 and 40 are formed with a preferred contour for mating with an associated hinged coupling ring 18. At least one flange 38 preferably includes a seat or groove 42 for a gasket, such as a O-ring, Quad ring or the like. The transverse aperture 37 is sized for allowing a determined clearance for shaft 24 to pass therethrough.

Referring again to FIGS. 1 and 2, the coupling ring 18 has a V-shaped groove 44 formed along an interior surface 46 of its two semi-circular ring portions 48 and 50. The portions 48 and 50 are pivotally attached to a common link plate 52. The hinged coupling ring 18 is clamped to the housing 16 by a stud and thumb nut arrangement 54. A slotted aperture 56 allows for quick opening and/or engagement of the coupling ring 18 as needed.

Figure 6:
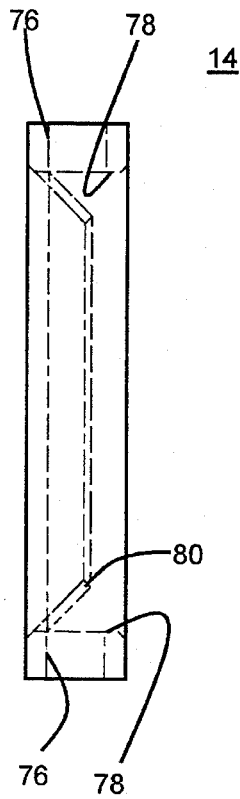
FIG. 6 represents a left side elevation of the valve seat member, a right side elevation being a mirror image.
Figure 5:
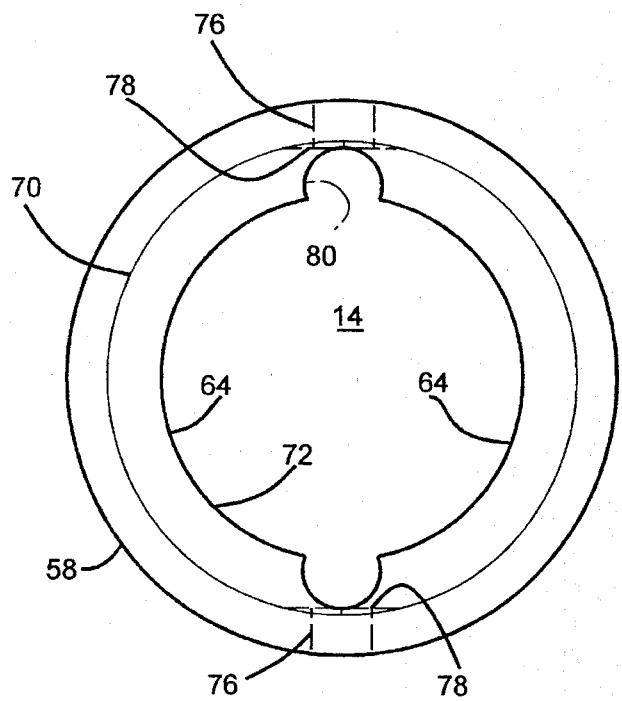
FIG. 5 represents a plan view of the valve seat member of the present invention.
Figure 7:
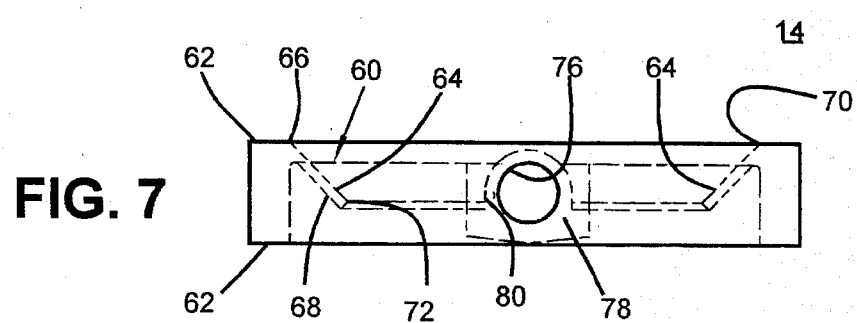
FIG. 7 represents a front elevation view of the valve seat member, the rear elevation view being a mirror image thereof.

Referring in particular to FIGS. 5, 6, and 7, the valve seat 14 has an outer diameter 58, a selectively contoured seat portion 60 and ends 62. This valve seat 14 is formed with a predetermined length which may be measured as the distance between ends 62. The seat portion 60 includes a pair of sealing lips 64. Each of the sealing lips 64 has a selected thickness and is cantilevered at a selected angle from a selected point near an infeed end of the ends 62 of the valve seat 14. It preferred that the selected angle be within the range of 40 degrees to 50 degrees to the horizontal. It has been found that a selected angle in the neighborhood of 45 degrees provides excellent results. This cantilevered arrangement provides a first attaching end 66, and a distal end 68. Each of the attaching ends 66 form a first throat portion 70. The first throat portion 70 should have an effective diameter that is equal to or slightly larger than the through bore 30. The distal ends 68 form arc segments of a second throat portion 72. This second throat portion 72 should have an effective radius that is smaller than the radius of the disk member 12. For example, a radial difference in the neighborhood of 8 mm. (0.31 in) has been found to provide good results. The location of the second throat portion should be below the pivoting axis of the disk member 12. It is preferred that the distance be between the range of 3 mm. and 4.2 min. It has been found that a distance of 3.6 mm. provides good results. It is also preferred that each of the distal ends 68 have a distal tip that provides a flat face, as may be seen in FIG. 2. For example; a sealing lip 64 having a thickness of 3.1 mm preferably has a distal tip that has its corner edges radiused or chamfered no greater than 0.37 mm. (0.015 in.). It is also been found that the flat face of the distal tip should be formed, at a determined included angle. That included angle is measured between the flat face and the elongated lower face of the sealing lip 64. It has been found and it is preferred that the included angle should be between 30 degrees and 95 degrees.

This valve seat 14 is preferably made of a resilient material such as an FDA approved elastomer. The hardness of the elastomer is preferred to be in the vicinity of 40 durometer. This valve seat 14 further includes a pair of transverse apertures 76 formed therein. The apertures 76 are sized to provide a tight bearing fit with its associated shaft 22 and 24. For example, if the diameter of the shafts 22 and 24 is 19 mm. (0.750 in.) the aperture should have a diameter in the vicinity of 18.8 mm (0.740 in.). A face seal is provided by a pair of flats 78, that are formed along an inside surface of the seat 14. These flats 78 are sized to abut the face of the hubs 20. The theoretical distance between the opposing flats 78 is slightly less than the distance between the faces of the hubs 20. This differential in length also provides a biasing action for the disc member 12. This biasing action provides a self-centering of the disc member 12 with respect to the seat 14.

The ends 80 of sealing lips 64 are contoured to allow the hubs 20 to pass therethrough. It has been found that a clearance in the neighborhood of 0.8 mm. (0.031 in.) provides good results. Particulate articles such as capsules, tablets, pills and the like will not pass between the ends 80 and its associated hub 20.

Referring again to FIGS. 1–4, a shouldered clamping ring 82 is provided to retain the valve seat 14. In this arrangement, the valve seat 14 is sealed and retained between the shelf portion 36 and a face 84 of the clamping ring 82. This clamping ring 82 includes a second through bore 86, a pilot diameter 88, and a third retaining flange 90. The pilot diameter 88 is selectively sized to closely and removably seat into the counterbore 32 of the housing 16. The third retaining flange 90 is sized to mate with the second retaining flange 40. The third retaining flange 90 is further contoured to be held in a preferred abutted condition with the second retaining flange 40 by the hinged coupling ring 18.

The present invention is effective when the flow of material is in the direction of the arrow, as may be seen in FIG. 2. The position of the disk member 12 for closure of the valve is shown in FIG. 4. The disk member 12 of the valve 10 has been rotated clockwise to the closed position. During the rotation of the disk member, the left sealing lip 64 will provide a sweeping action, with respect to an upper surface of the disk member 12. This sweeping action urges any particulate articles toward the central portion of the disk member 12. The right sealing lip 68 forms a substantially tangential seal with the peripheral edge 29 of the disk member 12. The clockwise rotating disk member 12 will sweep any particulate articles down and beyond the sealing lip 68.

The valve seat 14 of the present invention will also provide the desired flow control of particulate articles if the disk member is rotated to a closed condition in a counter clock wise rotation. The closed condition may be described as a mirror image of FIG. 4.

It is anticipated that the clamp ring may be removably attached to the housing by means of a flange arrangement that is retained by threaded fasteners. This arrangement may be used in situations that do not require easy disasssembly and cleaning.

Directional terms such as "left", "right", "front", "back", "in", "out", downward, and the like are applicable to the embodiments shown and described in conjunction with the drawings. These terms are merely used for the purpose of description in connection with the drawings and do not necessarily apply to the position in which the coupling of the present invention may be used.

While these particular embodiments of an improved coupling have been shown and described, it is to be understood that the invention is not limited thereto and protection is sought to the broadest extent that the prior art allows.

What is claimed is:

1. A modular butterfly valve for interrupting the flow of product such as tablets, capsules and the like without damaging said product comprising:

a) a disc member having a predetermined radius and being adapted to be rotated between an open position and a closed position, said disc member having opposing hubs, each hub member having a shaft member extending therefrom, a first of said shaft members having a sufficient length for extending exterior of the butterfly valve, a second of said shaft members having a determined length;

b) a housing having a first cylindrical through bore and a counterbore formed concentrically with said first through bore, said counterbore having a determined depth for providing a shelf portion, said housing having a first retaining flange and a second retaining flange, said first retaining flange being selectively contoured for engagement by a quick coupling ring, said second retaining flange being selectively contoured for engagement by second quick coupling ring, a transverse aperture being sized for allowing said first of said shaft members to pass therethrough with a predetermined clearance;

c) an elastomer valve seat having an outer diameter, a seat portion, and a pair of second transverse apertures, the seat portion having a pair of sealing lips being cantilevered at a selected angle from a selected portion of the valve seat near one end of the seat portion, the sealing lips having a predetermined thickness, an attaching end, and a distal end, each of the attaching ends forming a first throat portion, the distal end being contoured to provide a second throat portion, a radius of the second throat portion being smaller than the predetermined radius of the disc member; each of the pair of sealing lips having a predetermined length for positioning said distal end at a selected position with respect to an axis of said disc member, the sealing lip having a predetermined arcuate length;

d) a clamping ring having a second through bore, a pilot diameter, and a third retaining flange, the second through bore being substantially equal in diameter to said first through bore, the pilot diameter of said clamping ring being adapted to removably seat in said counterbore while retaining the valve seat in a preferred arrangement between a face of the clamping ring and the shelf portion of the housing, the third retaining flange being sized and contoured for a coupled abutment with the second retaining flange of the housing by the quick coupling ring;

wherein said disc member is resiliently suspended and biased by the valve seat for allowing self centering of the disc member in a direction transverse a direction of material flow, each distal end of the sealing lip of the valve seat abutting the disc member when in a closed position absent a cutting action for preventing damage to the product, and wherein one of the sealing lips abuts one side of the disk member, when the disk member is in the closed position and a second of the sealing lips abuts a peripheral edge of the disk member when the disk member is in the closed position.

2. A modular butterfly valve as recited in claim 1 wherein the selected angle of the sealing lips is in the range of 40 degrees and 50 degrees.

\* \* \* \* \*